United States Patent

Uchino et al.

[15] 3,680,960

[45] Aug. 1, 1972

[54] ATOMIC ABSORPTION PHOTOMETER

[72] Inventors: Koichi Uchino; Hiroshi Inomata, both of Katsuta, Japan

[73] Assignee: Hitachi, Ltd., Tokyo, Japan

[22] Filed: May 25, 1971

[21] Appl. No.: 146,620

[30] Foreign Application Priority Data

June 3, 1970   Japan.........................45/47156

[52] U.S. Cl. ....................356/87, 250/218, 356/96, 356/187
[51] Int. Cl..............................................G01j 3/42
[58] Field of Search....................356/74, 87, 96–98, 356/187, 201, 204; 250/43.5 R, 218

[56] References Cited

UNITED STATES PATENTS 3,067,332  12/1962  Peras ..........................356/81 X
3,583,844  6/1971  Smith..........................356/87 X
3,586,441  6/1971  Smith et al...................356/87 X

*Primary Examiner*—Ronald L. Wibert
*Assistant Examiner*—F. L. Evans
*Attorney*—Craig, Antonelli & Hill

[57] ABSTRACT

An atomic absorption photometer in which an electrical signal representative of the beam of light passed through a flame is integrated by an integrator, and an electrical signal representative of the emission spectrum peculiar to the flame is differentiated by a differentiator to be utilized as an integration starting signal. The photometer is provided with means for generating an electrical signal in response to the introduction of a standard sample into the flame and ceasing to generate the electrical signal in response to the introduction of a sample to be examined into the flame due to the fact that the emission spectrum of a particular substance in the sample to be examined appears when it is introduced into the flame. The photometer is further provided with means which generates an electrical signal in response to the application of both the electrical signal generated by said means and the output from the differentiator thereby offering a zero adjustment of the light absorbance.

13 Claims, 6 Drawing Figures

INVENTORS

KOICHI UCHINO and HIROSHI INOMATA

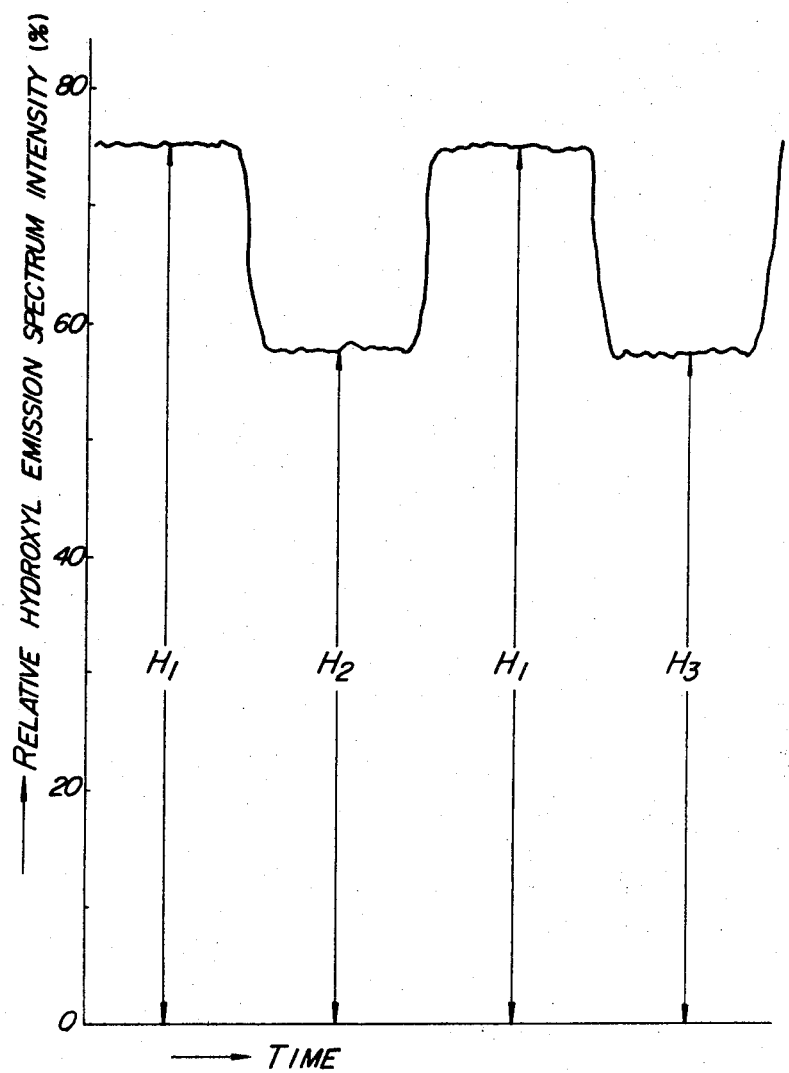

ATOMIC ABSORPTION PHOTOMETER

This invention relates to atomic absorption photometers and more particularly to an atomic absorption photometer of the type in which measurement on a sample to be examined is carried out in conjunction with measurement on a standard sample for the purpose of comparison therebetween and an electrical signal indicative of the absorption of light by the sample to be examined is integrated to display the averaged light absorption on a display means.

In an atomic absorption photometer, a liquid sample is introduced into a flame in an atomized form and a beam of light which will be absorbed by a particular substance to be analyzed (hereinafter referred to as by a substance) in the liquid sample is directed to the flame so as to detect and measure the absorption of the light beam by the subject substance in terms of the percent transmission or absorbance for the principal purpose of carrying out a quantitative analysis of the subject substance. The requirements for such atomic absorption photometer include a high and stable intensity of light and a narrow breadth of spectral lines. A hollow cathode discharge tube or lamp is generally used as a light source in order to satisfy these requirements. This hollow cathode discharge lamp comprises a glass envelope containing an inert gas such as argon therein, an anode of suitable shape, and a cathode made of a material which emits the same spectrum as the spectrum of the subject substance to be analyzed so as to obtain the desired spectrum by causing a glow discharge to occur between these two electrodes. The emission mechanism is based chiefly on the principle that cations produced due to the ionization of the inert gas act to excite the cathode and the vapor emitted from the cathode.

Actually, the hollow cathode discharge tube employed in the atomic absorption photometer has such a tendency that the intensity of the emission spectrum varies with time. Therefore, a sample to be examined is measured while collating it with a standard sample. More precisely, prior to measurement on a sample to be examined, an operation for adjusting the percent transmission to 100% or an operation for adjusting the absorbance to zero is generally carried out by the use of a standard sample. This operation will hereinafter be referred to as a zero adjustment operation for the simplicity of explanation. This zero adjustment operation may be carried out each time measurement is taken on a sample to be examined or several or tens of samples to be examined may be measured with only one zero adjustment operation. In any case, this zero adjustment operation has been carried out manually in conventional atomic absorption photometers and thus operators of the atomic absorption photometers have felt that this method of operation has many disadvantages.

The intensity of the light beam passed through the flame is not necessarily stable. Thus, it is common practice to integrate the electrical signal representative of the transmitted light beam for a certain period of time so as to read the mean value thereof thereby improving the accuracy of measurement. However, the integration of the electrical signal has heretofore been started manually according to common practice and thus the integration starting operation has been one of serious problems for the operators of the atomic absorption photometers.

It is an object of the present invention to provide an atomic absorption photometer for satisfactorily measuring the light absorbed by the subject substance in a sample to be examined which is introduced into a flame.

Another object of the present invention is to provide an atomic absorption photometer capable of automatically carrying out the zero adjustment operation.

A further object of the present invention is to provide an atomic absorption photometer in which the integration of an electrical signal representative of the beam of light passed through the flame can be started automatically.

The atomic absorption photometer embodying the present invention comprises a first means for producing a flame, a second means for introducing a standard sample and a sample to be examined into said flame, a third means for directing toward said flame a beam of light of the kind which will be absorbed by the subject substance in said sample to be examined, a fourth means for detecting the beam of light passed through said flame and converting such light into an electrical signal, a fifth means for integrating the electrical signal applied form said converting means, and a sixth means for displaying the electrical signal applied from said integrating means, whereby the light absorption of the subject substance in the sample being examined relative to that of the standard sample can be measured and the electrical signal indicative of the light absorption can be integrated.

The atomic absorption photometer comprises further a seventh means for detecting the introduction into said flame of the standard sample and the sample to be examined on the basis of a variation in the intensity of the emission spectrum peculiar to said flame and generating an electrical signal in response to such a variation, an eighth means for applying the electrical signal generated by said seventh means to said fifth means as an integration starting signal, a ninth means for detecting the introduction into the flame of either the standard sample or the sample to be examined on the basis of a variation in the intensity of the emission spectrum peculiar to the sample to be examined thereby generating an electrical signal in response to the introduction of the standard sample into said flame and ceasing to generate the electrical signal in response to the introduction of the sample to be examined into said flame, and a tenth means for generating an electrical signal in response to the application of both the electrical signal generated by said seventh means and the electrical signal generated by said ninth means thereby setting the value displayed by said sixth means at a predetermined value, whereby the zero adjusting operation can be automatically carried out and the integration can be automatically started.

Other objects, features and advantages of the present invention will be apparent from the following description of a preferred embodiment thereof taken in conjunction with the accompanying drawing, in which.

Figure 3:
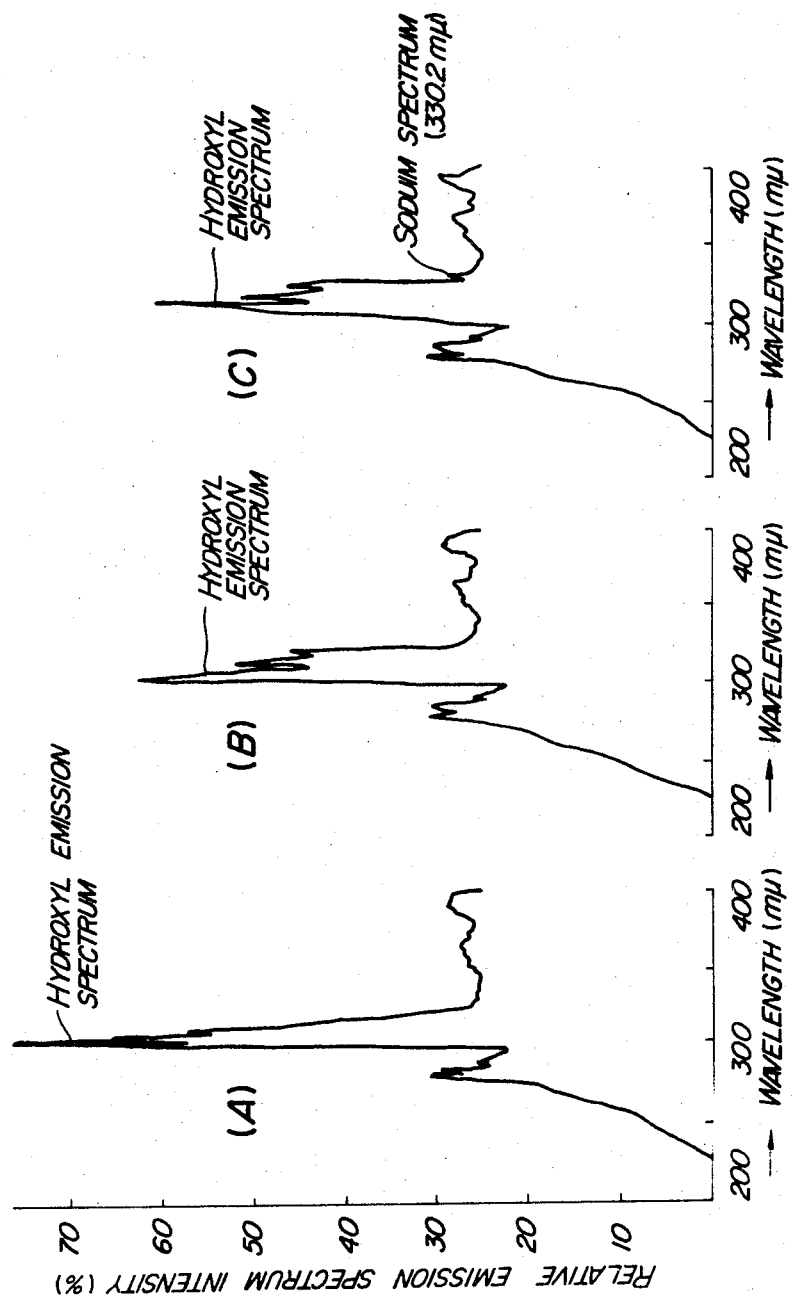

FIGS. 3*3b* and 3*c* are graphic illustrations of a hydroxyl emission spectrum; and FIG. 4 is a graph showing the hydroxyl emission spectrum intensity relative to time.

Figure 1:
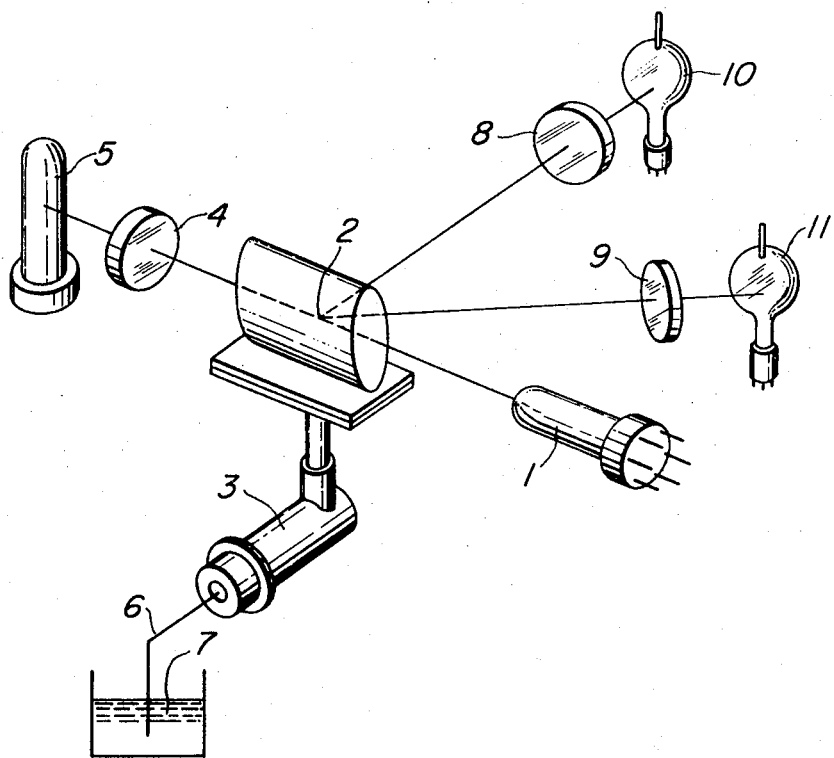
FIG. 1 is a diagrammatic perspective view showing the optical system of an atomic absorption photometer embodying the present invention.

Referring to FIG. 1, an atomic absorption photometer embodying the present invention has an optical system which includes a light source 1 which may be hollow cathode discharge lamp, a flame 2 toward which a beam of light emitted from the light source 1 is directed, a burner 3 for producing the flame 2, a detector 5 receiving the beam of light passed through the flame 2 through a monochromatic light transmission means 4, and detectors 10 and 11 receiving the emission spectrum from the flame 2 through respective filters 8 and 9. A sample 7 to be examined is contained in a vessel and one end of a sample suction tube 6 connected to the burner 3 is immersed in the sample 7.

Figure 2:
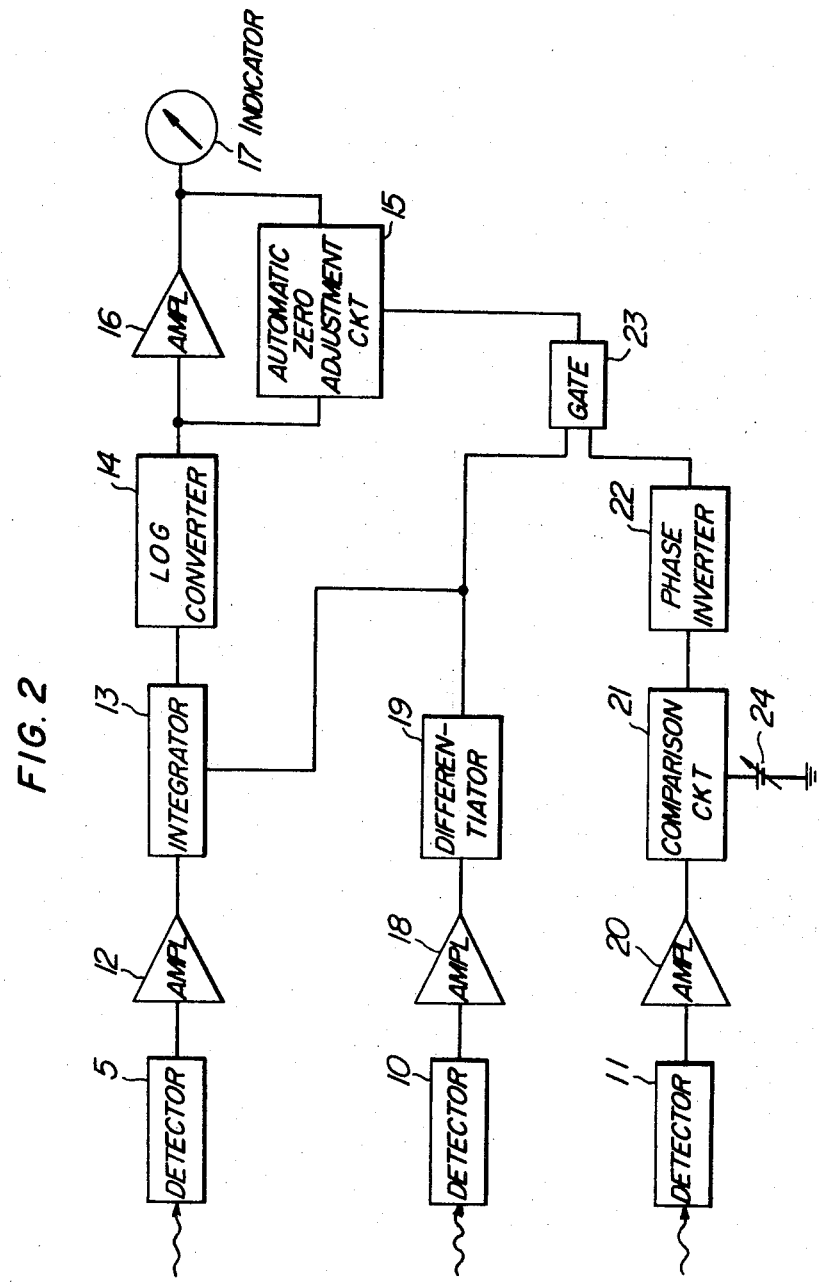
FIG. 2 is a block diagram of the electrical circuit system of the atomic absorption photometer shown in FIG. 1.

FIG. 2 shows an electrical circuit system of the atomic absorption photometer shown in FIG. 1. Referring to FIG. 2, a cascade connection of an amplifier 12, an integrator 13, a logarithmic converter 14, an amplifier 16 connected in parallel with an automatic zero adjustment circuit 15, and a display means or indicator 17 arranged in the above order is connected to the detector 5. A cascade connection of an amplifier 18 and a differentiator 19 arranged in the above order is connected to the detector 10. A cascade connection of an amplifier 20, a comparison circuit 21 provided with a reference voltage supply 24, and a sign converter or phase inverter 22 arranged in the above order is connected to the detector 11. The output terminal of the differentiator 19 is connected to the integrator 13, and the output terminals of the differentiator 19 and phase inverter 22 are connected to the input terminals of a gate 23 whose output terminal is connected to the automatic zero adjustment circuit 15.

In operation, the light source 1 emits a beam of light which will be absorbed by the subject substance in the sample 7 to be introduced into the flame 2, and this light beam is directed toward the flame 2. The sample 7 to be examined is drawn into the burner 3 through the sample suction tube 6 so that it is introduced into the flame 2 in an atomized form. As a result, the beam of light directed to the flame 2 is partly absorbed by the desired substance in the sample being examined while passing through the flame 2. The beam of light passed through the flame 2 enters the monochromatic light transmission means 4 by which the subject monochromatic light is solely selected to be detected by the detector 5. The monochromatic light transmission means 4 may be a filter or a light dispersing element such as a prism or diffraction grating.

The flame 2 may be any one of flames including an air-acetylene flame, a nitrous oxide-acetylene flame and an oxygen-acetylene flame. Even when the sample to be examined and a standard sample are not introduced into the flame 2, this flame 2 emits an emission spectrum peculiar to the flame. Further, an emission spectrum peculiar to the sample 7 being examined is emitted from the flame 2 when the sample 7 is introduced into the flame 2. The emission spectrum peculiar to the flame 2 is detected by the detector 10 through the filter 8, while the emission spectrum peculiar to the sample 7 being examined is detected by the detector 11 through the filter 9.

For the simplicity of explanation which will be given hereinafter, it is supposed that the subject substance in the sample 7 is sodium. Since the sodium emission spectrum has peaks at 330.2 m$\mu$ and 589 m$\mu$, it is supposed that the beam of light partly absorbed by the sodium while passing through the flame 2 and detected by the detector 5 is at the sodium emission spectrum of 330.2 m$\mu$. It is supposed further that the emission spectrum which is peculiar to the flame 2 and which is to be detected by the detector 10 is a hydroxyl emission spectrum having a peak at 310 m$\mu$, and the emission spectrum which is peculiar to the sample 7 and which is to be detected by the detector 11 is the sodium emission spectrum of 589 m$\mu$.

FIG. 3a shows the hydroxyl emission spectrum observed in the sample-free state of the flame 2, that is, in the state in which neither the standard sample nor the sample to be examined is introduced into the flame 2. FIG. 3b shows the hydroxyl emission spectrum observed when the standard sample is introduced into the flame 2. FIG. 3c shows the hydroxyl emission spectrum observed when the sample including the sodium to be examined is introduced into the flame 2. It will be seen from FIGS. 3a, 3b and 3c that the hydroxyl emission spectrum has a higher intensity in the sample-free state of the flame 2 than when the standard sample and the sample to be examined are introduced into the flame 2. This is because the temperature of the flame 2 is lower in the latter case than in the former case. The hydroxyl emission spectrum of 310 m$\mu$ is detected by the detector 10 to be converted into an electrical output signal. The intensity of this emission spectrum varies relative to time as shown in FIG. 4 when the standard sample is introduced into the flame 2 in the sample-free state thereof, and after restoring the flame 2 to its sample-free state again, the sample to be examined is introduced into the flame 2. In FIG. 4, $H_1$ represents the relative hydroxyl emission spectrum intensity in the sample-free state of the flame 2, $H_2$ represents the relative hydroxyl emission spectrum intensity when the standard sample is introduced into the flame 2, and $H_3$ represents the relative hydroxyl emission spectrum intensity when the sample to be examined is introduced into the flame 2.

At first, the standard sample which may be distilled water or ion exchange water is introduced into the sample-free flame 2 instead of the sample 7 to be examined. Due to the introduction of the standard sample into the flame 2, the relative intensity of the hydroxyl emission spectrum of 310 m$\mu$ varies rapidly from $H_1$ to $H_2$ in FIG. 4 and a corresponding variation occurs in the electrical signal delivered from the detector 10. This variation is amplified by the amplifier 18 and is then detected by the differentiator 19. That is, the differentiator 19 differentiates the electrical signal delivered from the detector 10, and generates an electrical signal immediately in response to an abrupt variation in the electrical signal applied thereto. In the state in which the standard sample is introduced into the flame 2, the detector 5 delivers an electrical signal representative of the present transmission of the standard sample or corresponding to the sodium emission spectrum of 330.2 m$\mu$ and this electrical signal is applied to the integrator 13 after being amplified by the amplifier 12. The electrical signal delivered from the differentiator 19 is applied to the integrator 13 as an integration starting signal, and the integrator 13 starts to integrate the electrical signal representative of the percent transmission of the standard sample. The integration continues for a predetermined period of time which is set by a timer or like means incorporated in the integrator 13. The electrical signal integrated by the integrator 13 is applied to the logarithmic converter 14 to be converted into an electrical signal representative of the light absorbance, the latter electrical signal being displayed on the display means or indicator 17 after being amplified by the amplifier 16. The automatic zero adjustment circuit 15 functions to automatically adjust the output from the amplifier 16 to a predetermined value, for example, zero and thus it carries out the automatic zero adjustment operation. The operation of this circuit 15 does not take place until a starting signal is applied thereto in a manner as will be described hereunder.

In the sample-free state of the flame 2 and in the state in which the standard sample is introduced into the flame 2, no electrical output signal appears from the detector 11 because the sodium emission spectrum of 589 m$\mu$ is not detected by the detector 11. Accordingly, no input signal is applied to the phase inverter 22 which is connected to the detector 11 through the amplifier 20 and comparison circuit 21. However, the function of the phase inverter 22 is such that an electrical signal appears therefrom when no input signal is applied thereto, while it ceases to deliver the electrical signal in response to the application of the input signal thereto. Thus, an electrical signal appears from the phase inverter 22 to be applied to the gate 23 not only when the flame 2 is in the sample-free state but also when the standard sample is introduced into the flame 2.

In response to the introduction of the standard sample into the sample-free flame 2, an electrical signal is applied from the differentiator 19 to the integrator 13 as an integration starting signal therefor, and at the same time, this signal is applied to the gate 23. Due to the application of both the electrical signal from the differentiator 19 and the electrical signal from the phase inverter 22 to the gate 23, an electrical signal appears at the output of the gate 23 and this electrical signal is applied to the automatic zero adjustment circuit 15 as a starting signal therefor. Thus, the automatic zero adjustment circuit 15 acts to adjust the output from the amplifier 16 to a predetermined value, for example, zero. In this way the zero adjustment operation can be automatically carried out by the automatic zero adjustment circuit 15.

Upon completion of the measurement on the standard sample, the measurement on the sodium in the sample 7 to be examined is started. Prior to this measurement, the flame 2 is restored to its sample-free state again, and then the sample 7 including the sodium to be examined is introduced into the flame 2. In response to the introduction of the sample 7 into the flame 2, the detector 5 delivers an electrical signal representative of the percent transmission of the sodium in the sample 7 or corresponding to the sodium emission spectrum of 330.2 m$\mu$ and this electrical signal is applied to the integrator 13 after being amplified by the amplifier 12. Further, an abrupt variation occurs in the electrical signal delivered from the detector 10 as seen in FIG. 4 when the sample 7 to be examined is introduced into the sample-free flame 2. As a result, an electrical signal appears from the differentiator 19 as when the standard sample is introduced into the sample-free flame 2, and this electrical signal is applied to the integrator 13 so that its integrating operation is started. The electrical signal representative of the sodium in the sample 7 being examined is integrated for a predetermined period of time by the integrator 13 and the integrated electrical signal is converted by the logarithmic converter 14 into an electrical signal representative of the light absorbance. This electrical signal is displayed on the indicator 17 after being amplified by the amplifier 16.

In this case, the sodium emission spectrum of 589 m$\mu$ emitted from the flame 2 is detected by the detector 11. Accordingly, an electrical signal is delivered from the detector 11 to be applied to the comparison circuit 21 after being amplified by the amplifier 20. The comparison circuit 21 compares this electrical signal with a reference signal applied from the reference voltage supply 24 and delivers an electrical signal only when the level of the electrical signal applied from the detector 11 through the amplifier 20 is higher than the level of the reference signal. The electrical signal delivered from the comparison circuit 21 is applied to the phase inverter 22. In spite of the application of the input signal from the comparison circuit 21 to the phase inverter 22, it does not deliver any electrical output signal since the function of the phase inverter 22 is such that it delivers an electrical signal when no input is applied thereto as described previously. During the measurement on the sample 7 to be examined, therefore, the gate 23 receives the electrical signal from the differentiator 19 but does not receive any electrical signal from the phase inverter 22 with the result that the gate 23 is closed and the automatic zero adjustment circuit 15 does not operate.

It will be easily understood from the foregoing description that the zero adjustment operation can be automatically carried out and the integration can be automatically started. In the present invention, arrangement is made so that the comparison circuit 21 compares the level of the electrical signal applied thereto with the level of the reference signal and delivers an electrical output signal only when the former is higher than the latter. This is because, otherwise, the phase inverter 22 may deliver an output signal due to noise when no output signal must be delivered therefrom, resulting in a possibility of mal-operation of the automatic zero adjustment circuit 15.

In the embodiment above described, especially in FIG. 2, the structure of the circuit elements is not shown in detail since the individual circuit elements are of structures well-known in the art.

What we claim is:

1. An atomic absorption photometer for measuring the absorption of light by a sample to be examined relative to a standard sample comprising a first means for producing a flame, a second means for introducing said standard sample and said sample to be examined into said flame, a third means for directing toward said flame a beam of light of the kind which will be absorbed by the subject substance in said sample to be examined, a fourth means for detecting the beam of light passed through said flame and converting such alight into an electrical signal, a fifth means for integrating the electrical signal applied from said fourth means, a sixth means for displaying the electrical signal applied from said fifth means, a seventh means for detecting the introduction into said flame of said standard sample and said sample to be examined on the basis of a variation in the intensity of the emission spectrum peculiar to said flame and generating an electrical signal in response to such a variation, an eighth means for applying the electrical signal generated by said seventh means to said fifth means as an integration starting signal, a ninth means for detecting the introduction into said flame of either said standard sample or said sample to be examined on the basis of a variation in the intensity of the emission spectrum peculiar to said sample to be examined thereby generating an electrical signal in a response to the introduction of said standard sample into said flame and ceasing to generate the electrical signal in response to the introduction of said sample to be examined into said flame, and a tenth means for generating an electrical signal in response to the application of both the electrical signal generated by said seventh means and the electrical signal generated by said ninth means thereby setting the value displayed by said sixth means at a predetermined value.

2. An atomic absorption photometer as claimed in claim 1, in which means is provided for converting the electrical signal applied from said fifth means into an electrical signal representative of the light absorbance.

3. An atomic absorption photometer as claimed in claim 1, in which said tenth means adjusts the value displayed by said sixth means to zero.

4. An atomic absorption photometer as claimed in claim 1, in which the emission spectrum peculiar to said flame is the hydroxyl emission spectrum.

5. An atomic absorption photometer as claimed in claim 1, in which means is provided for converting the electrical signal applied from said fifth means into an electrical signal representative of the light absorbance, said tenth means adjusts the value displayed by said sixth means to zero, and the emission spectrum peculiar to said flame is the hydroxyl emission spectrum.

6. An atomic absorption photometer for measuring the absorption of light by a sample to be examined relative to a standard sample comprising a first means for producing a flame, a second means for introducing said standard sample and said sample to be examined into said flame, a third means for directing toward said flame a beam of light of the kind which will be absorbed by the subject substance in said sample to be examined, a fourth means for detecting the beam of light passed through said flame and converting such light into an electrical signal, a fifth means for integrating the electrical signal applied from said fourth means, a sixth means for displaying the electrical signal applied from said fifth means, a seventh means for detecting the emission spectrum peculiar to said flame and converting same into an electrical signal, an eighth means connected to said seventh means for receiving the electrical signal applied therefrom and generating an electrical signal in response to the introduction of said standard generation of the electrical signal in response to the introduction of said sample to be examined into said flame, a Twelfth means for generating an electrical signal in response in response to the introduction of said sample to be examined into said flame, a ninth means for applying the electrical signal generated by said eighth means to said fifth means as an integration starting signal, a tenth means for detecting the emission spectrum peculiar to said sample to be examined and converting same into an electrical signal, an eleventh means connected to said tenth means for receiving the electrical signal therefrom so as to generate an electrical signal in response to the introduction of said standard sample into said flame and to cease the generating an electrical signal in response to the application of both the electrical signal generated by said eighth means and the electrical signal generated by said eleventh means, and a thirteenth means connected between said fifth means and said sixth means for adjusting the value displayed by said sixth means to a predetermined value in response to the application of the electrical signal from said twelfth means.

7. An atomic absorption photometer as claimed in claim 6, in which said emission spectrum peculiar to said flame is the hydroxyl emission spectrum.

8. An atomic absorption photometer as claimed in claim 6, in which means is connected between said fifth means and said thirteenth means for converting the electrical signal applied from said fifth means into an electrical signal representative of the light absorbance, and said thirteenth means adjusts the value displayed by said sixth means to zero.

9. An atomic absorption photometer as claimed in claim 6, in which said eighth means comprises means for differentiating the electrical signal applied from said seventh means by utilizing the fact that the level of the electrical signal generated by said seventh means is subject to a variation when either said standard sample or said sample to be examined is introduced into said flame in the sample-free state of the latter.

10. An atomic absorption photometer as claimed in claim 6, in which said eleventh means comprises means for inverting the phase of the signal applied from said tenth means so as to generate an electrical signal in response to the introduction of said standard sample into said flame and to cease to generate the electrical signal in response to the introduction of said sample to be examined into said flame.

11. An atomic absorption photometer as claimed in claim 10, in which said eleventh means comprises means connected between said tenth means and said phase inverting means for comparing the electrical signal applied from said tenth means with a predetermined setting and generating an electrical signal only when the level of the former is higher than the latter.

12. An atomic absorption photometer as claimed in claim 6, in which said eighth means comprises means for differentiating the electrical signal applied from said seventh means by utilizing the fact that the level of the electrical signal generated by said seventh means is subjected to a variation when either said standard sample or said sample to be examined is introduced into said flame in the sample-free state of the latter, and said eleventh means comprises means for comparing the electrical signal applied from said tenth means with a predetermined setting and generating an electrical signal only when the level of the former is higher than the latter and means for inverting the phase of the electrical signal applied from said comparing means so as to generate an electrical signal in response to the introduction of said standard sample into said flame and to cease to generate the electrical signal in response to the introduction of said sample to be examined into said flame.

13. An atomic absorption photometer as claimed in claim 12, in which means is connected between said fifth means and said thirteenth means for converting the electrical signal applied from said fifth means into an electrical signal representative of the light absorbance, said thirteenth means adjusts the value displayed by said sixth means to zero, and the emission spectrum peculiar to said flame is the hydroxyl emission spectrum.

* * * * *